(12) United States Patent
Salter et al.

(10) Patent No.: US 11,964,583 B2
(45) Date of Patent: Apr. 23, 2024

(54) UNATTENDED BI-DIRECTIONAL VEHICLE CHARGING

(71) Applicant: Ford Global Technologies, LLC, Dearborn, MI (US)

(72) Inventors: Stuart C. Salter, White Lake, MI (US); David Kennedy, Canton, MI (US); Annette Lynn Huebner, Highland, MI (US); Peter Phung, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 306 days.

(21) Appl. No.: 17/392,649

(22) Filed: Aug. 3, 2021

(65) Prior Publication Data
US 2023/0048233 A1    Feb. 16, 2023

(51) Int. Cl.
*B60L 53/66* (2019.01)
*B60L 53/14* (2019.01)
(Continued)

(52) U.S. Cl.
CPC ............. *B60L 53/665* (2019.02); *B60L 53/14* (2019.02); *B60L 53/53* (2019.02); *B60L 53/62* (2019.02);
(Continued)

(58) Field of Classification Search
CPC .......... B60L 53/14; B60L 53/53; B60L 53/62; B60L 53/65; B60L 53/68; B60L 2250/10; G01C 21/3407; G08B 5/38; G08B 7/06
(Continued)

(56) References Cited

U.S. PATENT DOCUMENTS 8,587,153 B2 * 11/2013 Schatz .................. B60L 53/124
307/104
9,407,105 B2     8/2016 Hyde et al.
(Continued)

FOREIGN PATENT DOCUMENTS

AU    2021100085 A4 *  4/2021
CN     103683440 A     3/2014
(Continued)

*Primary Examiner* — Atul Trivedi
(74) *Attorney, Agent, or Firm* — Brandon Hicks; Bejin Bieneman PLC (57) ABSTRACT

A computer can execute instructions to: receive power-receiving vehicle data identifying a power-receiving vehicle; identify one or more power-supplying vehicles for providing charging to the power-receiving vehicle; determine a rank for each of the identified one or more power-supplying vehicles based on the received power-receiving vehicle data and data received from the one or more power-supplying vehicles; upon selecting one of the one or more power-supplying vehicles, provide a navigation instruction to navigate at least one of the power-receiving vehicle and the selected power-supplying vehicle to a charging location based on a power-receiving vehicle location and a selected power-supplying vehicle location; and send access data to the power-receiving vehicle to access a charge port of the selected power-supplying vehicle; send a first light actuation instruction to the power-supplying vehicle based on a charging status; and send a second light actuation instruction to the power-receiving vehicle based on charging status.

16 Claims, 7 Drawing Sheets

(51) Int. Cl.
    *B60L 53/53*     (2019.01)
    *B60L 53/62*     (2019.01)
    *B60L 53/65*     (2019.01)
    *B60L 53/68*     (2019.01)
    *G01C 21/34*     (2006.01)
    *G08B 5/38*     (2006.01)
    *G08B 7/06*     (2006.01)

(52) U.S. Cl.
    CPC ............... *B60L 53/65* (2019.02); *B60L 53/68* (2019.02); *G01C 21/3407* (2013.01); *G08B 5/38* (2013.01); *G08B 7/06* (2013.01); *B60L 2250/10* (2013.01)

(58) Field of Classification Search
    USPC .......................................................... 701/22
    See application file for complete search history.

(56) References Cited

U.S. PATENT DOCUMENTS

| | | | |
|---|---|---|---|
| 10,688,881 B2 | 6/2020 | Tarnowsky et al. | |
| 11,148,549 B1* | 10/2021 | Alan | B60L 53/62 |
| 11,279,252 B1* | 3/2022 | Alan | B60L 53/16 |
| 2008/0231228 A1* | 9/2008 | Fowler | G06Q 30/02 |
| | | | 320/107 |
| 2009/0177595 A1* | 7/2009 | Dunlap | B60L 53/31 |
| | | | 320/109 |
| 2012/0005126 A1* | 1/2012 | Oh | H02J 7/34 |
| | | | 705/412 |
| 2017/0136902 A1* | 5/2017 | Ricci | B60L 53/38 |
| 2017/0136907 A1* | 5/2017 | Ricci | B60M 7/003 |
| 2019/0176633 A1* | 6/2019 | Booth | B60L 53/60 |
| 2019/0176637 A1* | 6/2019 | Booth | H02J 7/0013 |
| 2019/0383637 A1* | 12/2019 | Teske | B60L 53/14 |
| 2020/0067334 A1 | 2/2020 | Fan et al. | |
| 2020/0282855 A1* | 9/2020 | Slutzky | B60L 58/16 |
| 2020/0404470 A1 | 12/2020 | Mizutani et al. | |
| 2020/0412133 A1* | 12/2020 | Baldasare | G06V 40/172 |
| 2021/0081624 A1* | 3/2021 | Kovarik | E01F 9/578 |
| 2021/0086641 A1* | 3/2021 | Fuhlbrigge | B60L 53/14 |
| 2021/0203177 A1* | 7/2021 | Peng | B60L 53/63 |
| 2021/0300189 A1* | 9/2021 | Treadway | H04W 4/46 |
| 2021/0302182 A1* | 9/2021 | Treadway | G06N 20/00 |
| 2022/0258642 A1* | 8/2022 | Salter | B60L 53/14 |
| 2022/0281340 A1* | 9/2022 | Lu | B60L 55/00 |
| 2022/0357406 A1* | 11/2022 | Lu | H01M 10/425 |
| 2022/0363157 A1* | 11/2022 | Nakagawa | B60W 60/0023 |
| 2023/0048233 A1* | 2/2023 | Salter | G01C 21/3407 |
| 2023/0226941 A1* | 7/2023 | Ralya | B60L 53/63 |
| | | | 320/109 |
| 2023/0258731 A1* | 8/2023 | Lu | H02J 3/322 |
| | | | 320/137 |
| 2023/0412009 A1* | 12/2023 | Nago | H02J 50/80 |

FOREIGN PATENT DOCUMENTS

| | | | | |
|---|---|---|---|---|
| CN | 103891088 B | * | 6/2018 | ............... B60L 1/00 |
| DE | 102022113357 A1 | * | 12/2022 | ............... B60L 53/00 |
| DE | 102022113370 A1 | * | 12/2022 | ............... B60L 50/60 |
| JP | 2018152928 A | * | 9/2018 | |
| WO | WO-2020061525 A1 | * | 3/2020 | ............... B60L 50/62 |

\* cited by examiner

UNATTENDED BI-DIRECTIONAL VEHICLE CHARGING

BACKGROUND

An electric vehicle range is at least in part dependent on a charge level of the vehicle battery. The vehicle battery may be charged using electrical energy from a variety of sources, such as a connection to the power grid or another battery.

DETAILED DESCRIPTION

An electric vehicle's range is in part dependent on a charge level of the vehicle battery. As described herein, a vehicle battery may be charged using electrical energy from other vehicles (referred to herein as power-supplying vehicles). A power-supplying vehicle can be identified. Charging the vehicle battery can be efficiently accomplished using electrical energy from an identified power-supplying vehicle. A remote computer may receive data from candidate power-supplying vehicles, e.g., location, amount of available energy, etc. Upon receiving data from a power-receiving vehicle, the remote computer may select a candidate power-supplying vehicle for charging the power-receiving vehicle. The remote computer then sends directives to the power-receiving vehicle and the selected power-supplying vehicle to (i) navigate the vehicles to a charging location, if needed, (ii) output audio and/or visual guidance to the vehicles' respective human-machine interfaces to provide guidance for connecting a charging cable of the power-receiving vehicle to a charging port of the power-supplying vehicle, (iii) actuate lights of vehicles to flash to indicate a status of charging, and/or (iv) send updates about charging to human-machine interfaces of the vehicles.

In an example, a computer comprises a processor and a memory, the memory storing instructions executable by the processor, the instructions including instructions to: receive, from a power-receiving vehicle, power-receiving vehicle data identifying the power-receiving vehicle; identify one or more power-supplying vehicles for providing charging to the power-receiving vehicle; determine a rank for each of the identified one or more power-supplying vehicles based on the received power-receiving vehicle data and data received from the one or more power-supplying vehicles; upon selecting one of the one or more power-supplying vehicles, provide a navigation instruction to navigate at least one of the power-receiving vehicle and the selected power-supplying vehicle to a charging location based on a power-receiving vehicle location and a selected power-supplying vehicle location; and send access data to the power-receiving vehicle to access a charge port of the selected power-supplying vehicle; send a first light actuation instruction to the power-supplying vehicle based on a status of charging; and send a second light actuation instruction to the power-receiving vehicle based on the status of charging.

The power-receiving vehicle data can include a requested energy amount, a current charge level of a battery assembly of the power-receiving vehicle, and a location or a route of the power-receiving vehicle. The data received from the one or more power-supplying vehicles can include (i) a time window of availability for charging, (ii) data specifying whether the respective vehicle has an ability for a bidirectional charging, (iii) a location of the respective vehicle, and (iv) a fee rate for charging. The status of charging can include at least one of (i) approaching, (ii) ready to start charging, (iii) charging in progress, and (iv) charging completed.

The instructions can further include instructions to send the first light actuation instruction including a directive to flash one or more lights of the power-supplying vehicle based on a first rate determined based on the charging status.

The instructions can further include instructions to send the second light actuation instruction including a directive to flash one or more lights of the power-receiving vehicle based on a second rate determined based on the charging status.

The instructions can further include instructions to output an audio instruction from the power-supplying vehicle based on the status of charging.

The rank can specify a suitability of a respective power-supplying vehicle to charge the power-receiving vehicle.

A method for charging a power-receiving vehicle comprises: receiving, from the power-receiving vehicle, power-receiving vehicle data identifying the power-receiving vehicle; identifying one or more power-supplying vehicles for providing charging to the power-receiving vehicle; determining a rank for each of the identified one or more power-supplying vehicles based on the received power-receiving vehicle data and data received from the one or more power-supplying vehicles; and upon selecting one of the one or more power-supplying vehicles, providing a navigation instruction to navigate at least one of the power-receiving vehicle and the selected power-supplying vehicle to a charging location based on a power-receiving vehicle location and a selected power-supplying vehicle location; sending access data to the power-receiving vehicle to access a charge port of the selected power-supplying vehicle; sending a first light actuation instruction to the power-supplying vehicle based on a status of charging; and sending a second light actuation instruction to the power-receiving vehicle based on the status of charging.

The power-receiving vehicle data can include a requested energy amount, a current charge level of a battery assembly of the power-receiving vehicle, and a location or a route of the power-receiving vehicle. The data received from the one or more power-supplying vehicles can include (i) a time window of availability for charging, (ii) data specifying whether the respective vehicle has an ability for a bidirectional charging, (iii) a location of the respective vehicle, and (iv) a fee rate for charging. The status of charging can include at least one of (i) approaching, (ii) ready to start charging, (iii) charging in progress, and (iv) charging completed.

The method can further comprise sending the first light actuation instruction including a directive to flash one or more lights of the power-supplying vehicle based on a first rate determined based on the charging status.

The method can further comprise sending the second light actuation instruction including a directive to flash one or more lights of the power-receiving vehicle based on a second rate determined based on the charging status.

The method can further comprise outputting an audio instruction from the power-supplying vehicle based on the status of charging.

The rank can specify a suitability of a respective power-supplying vehicle to charge the power-receiving vehicle.

Figure 1:
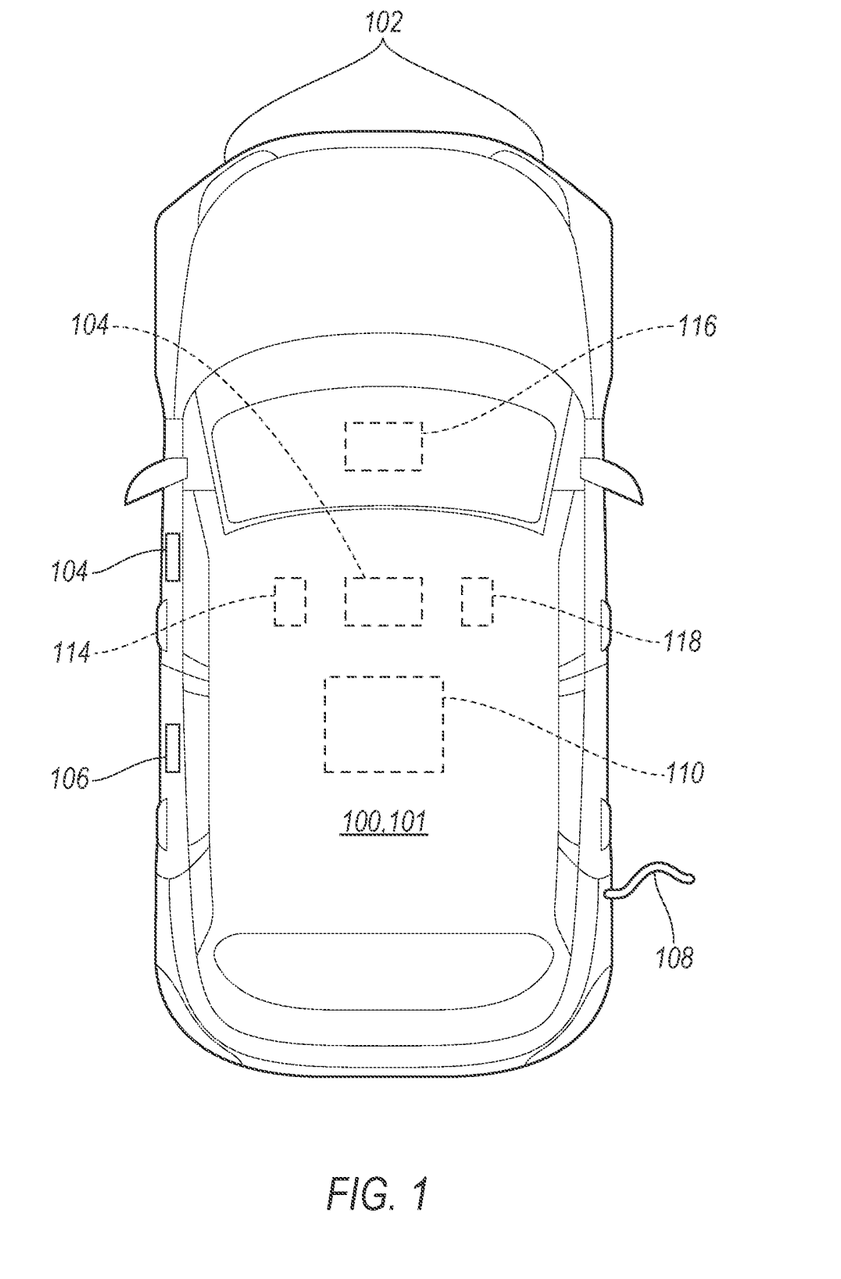
FIG. 1 shows an example vehicle.

With reference to FIG. 1, a vehicle 100, 101 may be any suitable type of ground vehicle, e.g., a passenger or commercial automobile such as a sedan, a coupe, a truck, a sport utility, a crossover, a van, a minivan, a taxi, a bus, etc.

A power-supplying vehicle 101 and a power-receiving vehicle 100 may include similar components, such as one or more computers 114, sensors 116, actuators 118, charging port 106, charging cable 108, battery assembly 110, human machine interface 104 (HMI), light 102, etc.

The vehicle computer 114 or a remote computer 120 includes a processor and a memory. The memory includes one or more forms of computer 114 readable media, and stores instructions executable by the vehicle computer 114 for performing various operations, including as disclosed herein. For example, the computer 114 can be a generic computer 114 with a processor and memory as described above and/or may include an electronic control unit ECU or controller for a specific function or set of functions, and/or a dedicated electronic circuit including an ASIC that is manufactured for a particular operation, e.g., an ASIC for processing sensor 116 data and/or communicating the sensor 116 data. In another example, computer 114 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer 114. The memory can be of any type, e.g., hard disk drives, solid-state drives, servers, or any volatile or non-volatile media. The memory can store the collected data sent from the sensors 116. The memory can be a separate device from the computer 114, and the computer 114 can retrieve information stored by the memory via a network in the vehicle, e.g., over a CAN bus, a wireless network, etc. Alternatively or additionally, the memory can be part of the computer 114, e.g., as a memory of the computer 114.

The computer 114 may include programming to operate one or more of vehicle brakes, propulsion e.g., control of acceleration in the vehicle by controlling one or more of an internal combustion engine, electric motor, hybrid engine, etc., steering, climate control, interior and/or exterior lights 102, etc., as well as to determine whether and when the computer 114, as opposed to a human operator, is to control such operations. Additionally, the computer 114 may be programmed to determine whether and when a human operator is to control such operations. The computer 114 may include or be communicatively coupled to, e.g., via a vehicle network such as a communications bus as described further below, more than one processor, e.g., included in components such as sensors 116, electronic control units (ECUs) or the like included in the vehicle for monitoring and/or controlling various vehicle components, e.g., a powertrain controller, a brake controller, a steering controller, etc. The computer 114 is generally arranged for communications on a vehicle communication network that can include a bus in the vehicle such as a controller area network CAN or the like, and/or other wired and/or wireless mechanisms. Alternatively or additionally, in cases where the computer 114 comprises a plurality of devices, the vehicle communication network may be used for communications between devices represented as the computer 114 in this disclosure. Further, as mentioned below, various controllers and/or sensors 116 may provide data to the computer 114 via the vehicle communication network.

Vehicles 100, 101 typically include a variety of sensors 116. A sensor 116 is a device that can obtain one or more measurements of one or more physical phenomena. Some sensors 116 detect internal states of the vehicle, for example, wheel speed, wheel orientation, and engine and transmission variables. Some sensors 116 detect the position or orientation of the vehicle, for example, global positioning system GPS sensors 116; accelerometers such as piezo-electric or microelectromechanical systems MEMS; gyroscopes such as rate, ring laser, or fiber-optic gyroscopes; inertial measurements units IMU; and magnetometers. Some sensors 116 detect the external world, for example, radar sensors 116, scanning laser range finders, light 102 detection and ranging LIDAR devices, and image processing sensors 116 such as cameras. A LIDAR device detects distances to objects by emitting laser pulses and measuring the time of flight for the pulse to travel to the object and back. Some sensors 116 are communications devices, for example, vehicle-to-infrastructure V2I or vehicle-to-vehicle V2V devices. Sensor 116 operation can be affected by obstructions, e.g., dust, snow, insects, etc. Often, but not necessarily, a sensor 116 includes a digital-to-analog converter to converted sensed analog data to a digital signal that can be provided to a digital computer 114, e.g., via a network. Sensors 116 can include a variety of devices, and can be disposed to sense and environment, provide data about a machine, etc., in a variety of ways. For example, a sensor 116 could be mounted to a stationary infrastructure element on, over, or near a road. Moreover, various controllers in a vehicle may operate as sensors 116 to provide data via the vehicle network or bus, e.g., data relating to vehicle speed, acceleration, location, subsystem and/or component status, etc. Further, other sensors 116, in or on a vehicle, stationary infrastructure element, etc., infrastructure could include cameras, short-range radar, long range radar, LIDAR, and/or ultrasonic transducers, weight sensors 116, accelerometers, motion detectors, etc., i.e., sensors 116 to provide a variety of data. To provide just a few non-limiting examples, sensor 116 data could include data for determining a position of a component, a location of an object, a speed of an object, a type of an object, a slope of a roadway, a temperature, a presence or amount of moisture, a fuel level, a data rate, etc.

The actuators 118 may be implemented via circuits, chips, or other electronic components that can actuate various vehicle subsystems in accordance with appropriate control signals as is known. The actuators 118 may be used to control braking, acceleration, and steering of the vehicle. As an example, the vehicle computer 114 may output control instructions to control the actuators 118.

The vehicle 100, 101 may include a human-machine interface (HMI), e.g., one or more of a display, a touchscreen display, a microphone, a loudspeaker, etc. The user can provide input to devices such as the computer 114 via the HMI 104. The HMI 104 can communicate with the computer 114 via the vehicle network, e.g., the HMI 104 can send a message including the user input provided via a touchscreen, microphone, a camera that captures a gesture, etc., to a computer 114, and/or can display output, e.g., via a screen, loudspeaker, etc. A loudspeaker, or speaker, is a device that, as is well known, can convert an electrical signal to sound, i.e., a speaker can include a transducer that converts the electric signal to vibrations to generate sound at a desired frequency. A speaker can receive the electrical signal from an audio amplifier. The vehicle may include HMI 104 mounted to a vehicle exterior surface to communicate with a user located outside the vehicle 100, 101.

The battery assembly 110 can include a battery or batteries of any suitable type for vehicular electrification, for example, lithium-ion batteries, nickel-metal hydride batteries, lead-acid batteries, or ultracapacitors, as used in, for example, plug-in hybrid electric vehicles PHEVs, hybrid electric vehicles HEVs, or battery electric vehicles BEVs. The battery assembly 110 typically includes a battery tray and at least one battery module fixed to the battery tray. For example, the battery assembly 110 may include four battery modules. In examples including multiple battery modules, adjacent ones of the battery modules are connected to each other, as described further below. Each battery module may include one or more battery cells. The battery tray may include a battery compartment that receives the battery modules. The battery assembly 110 may include any suitable hardware, e.g., wiring, connectors, circuits, etc., connecting the battery modules to each other and to electrified components of the vehicle.

A charging cable 108 provides an electrical connection to transfer electrical energy to a power-receiving vehicle 100 or from a power-supplying vehicle 101. For example, a charging cable 108 of a power-receiving vehicle 100 may be mechanically and electrically connectable to a port of a power-supplying vehicle 101. A charging cable 108 includes electrical wiring and connected to transfer electrical energy. The charging cable 108 may be retractable to be placed inside the power-receiving vehicle 100, or disconnected and stored in the power-receiving vehicle 100. Thus, in a connected state, a charging cable 108 provides electrical connection between the power-receiving vehicle 100 and the power-supplying vehicle 101. Additionally or alternatively, the charging cable 108 of the power-receiving vehicle 100 may be mechanically and electrically connectable to the charging cable 108 of the power-supplying vehicle 101, e.g., directly or via an adaptor.

A power-supplying vehicle 101 may include a charging port 106, e.g., a socket attached on an exterior surface of a body of the power-supplying vehicle 101. The charging port 106 may have a cover that protects the charging port 106 from not-permitted charging. The power-supplying vehicle 101 may include an actuator 118 for unlocking the cover of the charging port 106. Additionally or alternatively, the power-supplying vehicle 101 may include an electrical actuator 118, e.g., a relay or semi-conductor switch, for activating or deactivating the charging port 106.

A vehicle 100, 101 may include multiple lights 102 mounted in the interior or on the exterior of the vehicle, e.g., headlight, taillight, blinker, etc. A computer 114 may be programmed to actuate one or more lights 102 to turn on, turn off, or flash.

Figure 2:
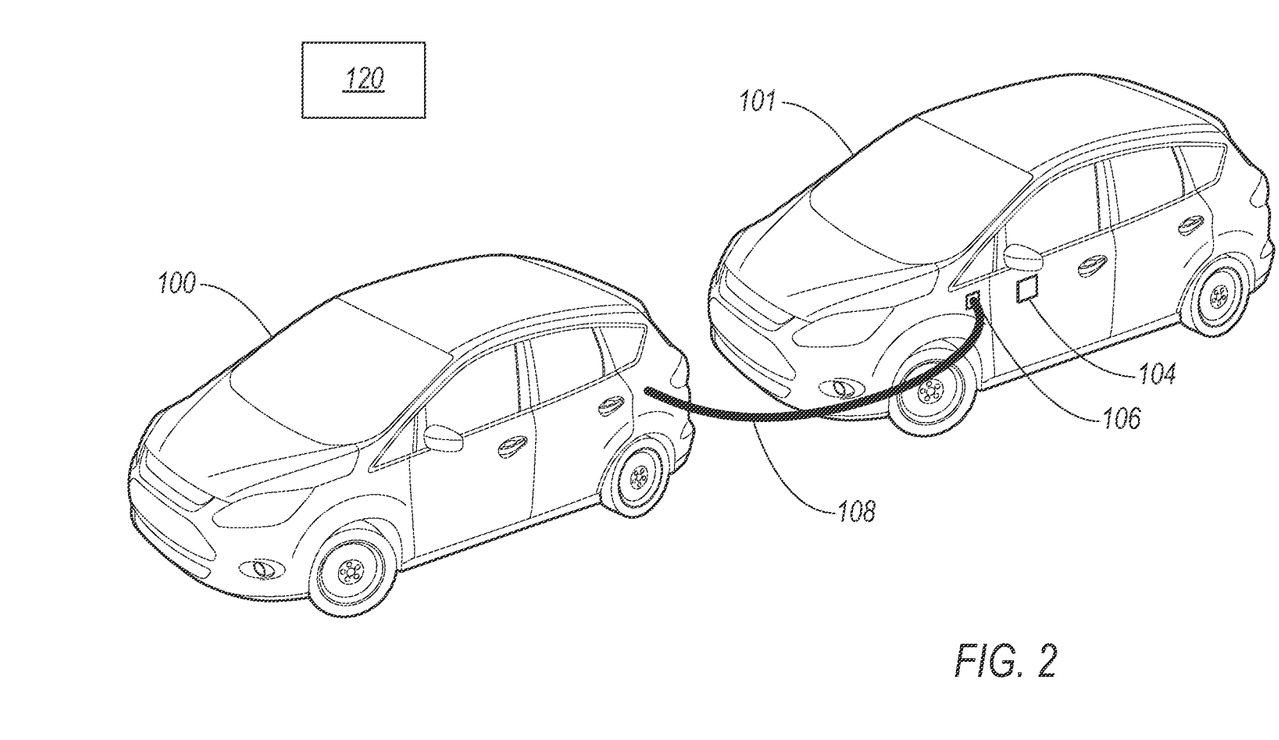
FIG. 2 shows a power-receiving vehicle by a power-supplying vehicle.

With reference to FIGS. 1 and 2, a battery assembly 110 of a power-receiving vehicle 100 may need charging in order to reach a destination. A power-supplying vehicle 101 may provide the needed electrical energy to the power-receiving vehicle 100. To identify the power-supplying vehicle 101, a remote computer 120, e.g., at a service center, can be programmed to receive, from the power-receiving vehicle 100, power-receiving vehicle 100 data identifying the power-receiving vehicle 100, to identifying one or more power-supplying vehicles 101 for providing charging to the power-receiving vehicle 100, to determine a rank, as discussed below, for each of the identified one or more power-supplying vehicles 100 based on the received power-receiving vehicle 100 data and data received from the one or more power-supplying vehicles 101.

The remote computer 120 can be further programmed, upon selecting one of the one or more power-supplying vehicles 101, providing a navigation instruction to navigate at least one of the power-receiving vehicles 100 and the selected power-supplying vehicle 100 to a charging location based on a power-receiving vehicle 100 location and a selected power-supplying vehicle 101 location, to send access data to the power-receiving vehicle 100 to access a charging port 106 of the selected power-supplying vehicle 101, to send a first light 102 actuation instruction to the power-supplying vehicle 101 based on a status of charging, to send a second light 102 actuation instruction to the power-receiving vehicle 100 based on the status of charging.

With reference to Table 1 below illustrates example data that a power-receiving vehicle 100 may send to a remote computer 120. The data sent from a power-receiving vehicle 100 may include a requested energy amount, a current charge level, a maximum range, e.g., specified in kilometers, etc., of the battery assembly 110 of the power-receiving vehicle 100, and the location or route of the power-receiving vehicle 100. In one example, the computer 114 may be programmed to send the data upon receiving a request from a vehicle HMI 104, e.g., a touch-screen in the power-receiving vehicle 100, a mobile phone of a user of the power-receiving vehicle 100, etc.

TABLE 1

| Datum | Description |
|---|---|
| Requested energy amount | An amount of energy the power-receiving vehicle 100 needs to reach a specified destination, e.g., specified in kilowatt (kw). |
| Current charge level | An amount of energy stored in the battery, e.g., specified in percentage of capacity, or kilowatt (kw), etc. For example, the amount of energy stored in the battery may be determined based on data received from a battery sensor. |
| Maximum range | A range of the vehicle based on the current charge, e.g., specified in kilometers, etc. A vehicle range may be determined based on (i) current charge, (ii) road condition, e.g., flat, uphill, downhill, etc., (iii) type of road, e.g., freeway, urban area, etc. |
| Location | Specifying location coordinates of the vehicle, e.g., GPS (global positioning system) coordinates. |

TABLE 1-continued

| Datum | Description |
|---|---|
| Route | Specifying a route of the vehicle to a vehicle specified destination. |
| Electrical configuration | Data pertaining to electrical and mechanical properties of the charging cable 108, e.g., socket type, voltage, etc. |
| Vehicle identifier | A set of data for identifying the vehicle, e.g., vehicle identification number (VIN) |

Computers 114 in power-supplying vehicles 101 may be programmed to send data, e.g., as illustrated in Table 2, including (i) a time window of availability for charging, (ii) data specifying whether the respective vehicle 100 has an ability for a bidirectional charging, (iii) a location of the respective vehicle 100, and (iv) a cost for charging. Thus, the remote computer 120 may be programmed to store the received data from the power-supplying vehicles 101.

TABLE 2

| Datum | Description |
|---|---|
| Time window of availability for charging | data may include one or more time windows each including a start time and an end time, e.g., Monday 2 pm to 4 pm. |
| Available charge | An amount of energy available to charge a power-receiving vehicle 100, e.g., determined based on a current charge of the battery and a specified route of the vehicle to a next charging location. A current charge may be determined based on data received from a battery sensor. Additionally or alternatively, the available charge may be determined based on input received from a user of the respective power-supplying vehicle 101. |
| Location | specifying location coordinates of the vehicle, e.g., GPS coordinates. |
| Bidirectional charging capability | Data specifying whether the vehicle allows bidirectional charging, i.e., whether the vehicle electrical system allows charging of another vehicle from energy stored in the power-supplying vehicle 101. A vehicle that lacks bidirectional charging capability only can be charged from an external source but cannot provide charge to an external user, e.g., a power-receiving vehicle. |
| Electrical configuration | data pertaining to electrical and mechanical properties of the charging cable 108 and/or charging port 106, e.g., socket type, voltage, etc. |
| Vehicle identifier | a set of data for identifying the vehicle, e.g., vehicle identification number (VIN) |

A rank specifies suitability of a respective power-supplying vehicle 100 to charge the power-receiving vehicle 100. In one example, the rank of a vehicle 100 is relative to ranks of other vehicles 100, i.e., specifies a position in a list, e.g., 1, 2, 3, etc. The remote computer 120 may be programmed to determine the rank based on the power-receiving vehicle 100 data and the power-supplying vehicle 101 data. In one example, the remote computer 120 may identify the power-supplying vehicles 101 by determining that (i) a power-receiving vehicle 100 is compatible with the power-receiving vehicle 100 based on the respective electrical configuration data, e.g., electrical connectors can match, voltage match, etc., (ii) the power-supplying vehicle 101 has a bidirectional charging capability, and/or (iii) available energy is sufficient, i.e., the available energy is greater than the requested amount of energy. Other factors could additionally or alternatively be considered. such as a vehicle 101 security rating, average time to time to respond to a charge request, percent of charge requests fulfilled successfully, etc. Then, the remote computer 120 may determine the rank of the identified power-supplying vehicles 101 based on a distance between the power-receiving vehicle 100 and respective power-supplying vehicle 101. Thus, a first power-supplying vehicle 101 with a first distance to the power-receiving vehicle 100 is ranked higher than a second vehicle with a second distance to the power-receiving vehicle 100 when the second distance is larger than the first distance.

The remote computer 120 may be programmed to select a power-supplying vehicle 101 with the highest rank for charging the power-receiving vehicle 100. The remote computer 120 may be programmed to provide a navigation instruction to navigate (i) the power-receiving vehicle 100 to the location of the power-supplying vehicle 101, (ii) to navigate the power-supplying vehicle 101 to the location of the power-receiving vehicle 100, or (iii) at least one of the power-receiving vehicles 100 and the selected power-supplying vehicle 100 to a charging location. In one example, the remote computer 120 may determine the navigation instruction based determining at which location the power-receiving vehicle 100 and the selected power-supplying vehicle 101 can stop next to one another such that the charging cable 108 can be connected. For example, upon determining that the power-receiving vehicle 100 is in a parking garage and parking spaces around the power-receiving vehicle 100 are occupied and same condition applies to the power-supplying vehicle 101, the remote computer 120 may determine a first navigation instruction for the power-receiving vehicle 100 to navigate to a selected location with sufficient space for the power-receiving vehicle 100 and the power-supplying vehicle 101 and determine a second navigation instruction for the selected power-supplying vehicle 101 to navigate to the selected location.

In order to prevent unauthorized use of a power-supplying vehicle 101 for charging another vehicle, the power-supplying vehicle 101 may include various mechanical and/or electrical components and/or systems for controlling access to the power-supplying vehicle 101 charging port 106. In one example, the computer 114 of the selected power-supplying vehicle 101 may be programmed, upon receiving a directive from the remote computer 120, to (i) unlock a cover of the charging port 106, and/or (ii) activate the charging port 106 by actuating a relay to allow charging of the power-receiving vehicle 100.

A status of charging defines various states of charging of the power-receiving vehicle 100. Table 3 shows an example set of charging states.

TABLE 3

| State | Description |
|---|---|
| Approaching | A distance between the power-receiving vehicle 100 and the selected power-supplying vehicle 101 is less than a threshold, e.g., 200 meters (m). |
| Ready to start charging | The charging is authorized, e.g., the cover is unlocked, and the power-receiving vehicle 100 and the power-supplying vehicle 101 are located at the charging location. |
| Charging in progress | The charging cable 108 connects the power-receiving vehicle 100 and the power-supplying vehicle 101 socket. Electrical energy is flowing from the power-supplying vehicle 101 to the power-receiving vehicle 100. |
| Charging completed | The requested amount of energy is transferred to the power-receiving vehicle 100. |

As discussed above, the power-receiving vehicle 100 and/or power-supplying vehicle 101 may be moved based on navigation instructions from the remote computer 120. The remote computer 120 may be programmed to send a first actuation instruction to the power-supplying vehicle 101 to flash one or more lights 102 based on a first rate determined based on the charging status. The remote computer 120 may be programmed to send a second actuation instruction to flash one or more lights 102 of the power-receiving vehicle 100 based on a second rate determined based on the charging status. In one example, when the charging status is approaching, the first and second rates may be 2 times per second. In yet another example, the first and second rates may be different, e.g., 2 times per second and 3 times per second.

To connect the charging cable 108 and/or start the charging, a user may need further information. The remote computer 120 may be programmed to actuate a speaker, e.g., mounted to an exterior of the power-supplying vehicle 101, of the power-supplying vehicle 101 to output an audio instruction based on the status of charging. The remote computer 120 may be programmed to determine the charging state is "ready to start charging," upon determining that the power-receiving vehicle 100 and the power-supplying vehicle 101 are at the charging location.

The charging location includes at least one of (i) the power-supplying vehicle 101 when the power-receiving vehicle 100 navigates to the power-supplying vehicle 101 for charging, (ii) the power-receiving vehicle 100 when the power-supplying vehicle 101 is navigated to the location of the power-receiving vehicle 100, or (iii) a third location to which the power-supplying vehicle 101 and the power-receiving vehicles 100 are navigated, e.g., an empty area of a parking area. The charging location may be a specified point or an area, e.g., rectangular or circular, defined by GPS location coordinates of a reference location, e.g., a center point, and perimeter or radius of the area.

The remote computer 120 may be programmed to determine the charging state is "ready to start charging," upon determining that the power-receiving vehicle 100 and the power-supplying vehicle 101 are within the area defined as the charging location. Additionally or alternatively, the remote computer 120 may determine further conditions for the ready to start charging state, e.g., a specified direction of the power-receiving vehicle 100 relative to the power-supplying vehicle 101 such that the charging cable 108 can reach between the power-receiving vehicle 100 and the power-supplying vehicle 101.

The remote computer 120 may be programmed to output visual guidance, e.g., showing explanation(s) on a display mounted to the exterior of the power-supplying vehicle 101 including guidance on how the charging cable 108 can be connected to charge the power receiving vehicle using electrical power from the power-supplying vehicle 101.

Figure 3:
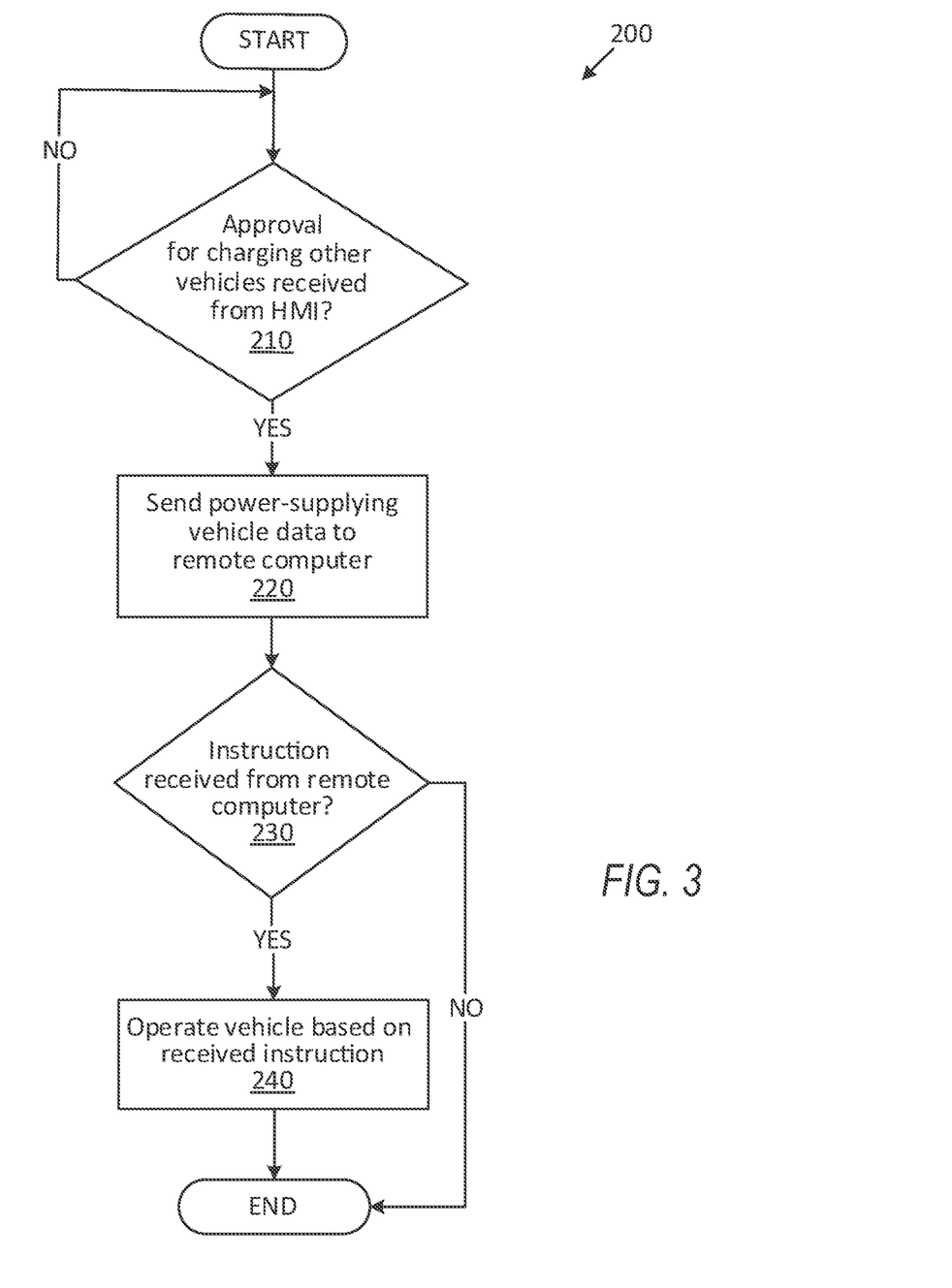
FIG. 3 is a flowchart of an example process for a power-supplying vehicle to charge a power-receiving vehicle.

FIG. 3 is a flowchart of an exemplary process 200 for a power-supplying vehicle 101 to charge a power-receiving vehicle 100. A computer 114 in a power-supplying vehicle 101 may be programmed to execute blocks of the process 200. A vehicle may at a first time be a power-supplying vehicle 101 supplying power to another vehicle that is a power-supplying vehicle 101, and at a second time receive power from another vehicle that is a power-supplying vehicle 101, the vehicle that at the first time was a power supplying vehicle 101 is at the second time a power-receiving vehicle 100. The process 200 reflects an operation of a power-supplying vehicle 101. As discussed with reference to FIG. 3, a process 300 describes an operation of a power-receiving vehicle 100.

The process 200 begins in a decision block 210, in which the computer 114 determines whether approval for charging a power-receiving vehicle 100 is received. The computer 114 may be programmed to receive approval for charging a power-receiving vehicle 100 from a vehicle HMI 104, e.g., based on user input, or from a remote device associated with the power-supplying vehicle 101, e.g., a user mobile device. Additionally, the computer 114 may be programmed to receive data such as a time window of availability for charging, etc., as discussed above with reference to Table 2. If the computer 114 determines that approval for supplying power to a power-receiving vehicle 100 is received, then the process 200 proceeds to a block 220, otherwise the process 200 returns to the decision block 210.

In the block 220, the computer 114 sends power-supplying vehicle 101 data to a remote computer 120, e.g., as discussed with reference to Table 2.

Next, in a decision block 230, the computer 114 determines whether a directive is received from the remote computer 120. The computer 114 may be programmed to determine that a directive is received upon receiving (i) a message specifying to flash one or more lights 102 of the power-supplying vehicle 101, (ii) a directive to navigate to a charging location, e.g., a location of a power-receiving vehicle 100, (iii) a directive to activate a power-supplying port, or (iv) a directive to provide access to the charging port 106, e.g., unlocking a or opening a cover. if the computer 114 determines that a directive is received, then the process 200 proceeds to a block 240, otherwise the process 200 ends, or alternatively returns to the decision block 210, although not shown in FIG. 3.

In the block 240, the computer 114 operates the power-supplying vehicle 101 based on the received instructions. For example, the computer 114 actuates lights 102 of the power-supplying vehicle 101 based on the received instruction to flash the lights 102. The computer 114 may navigate the power-supplying vehicle 101 to the charging location, e.g., by actuating vehicle actuators 118 and/or outputting navigation instructions to the HMI 104. The computer 114 may output audio and/or visual instructions to an HMI 104, e.g., mounted to an exterior surface of the power-receiving vehicle 100 for a user of the power-receiving vehicle 100. The computer 114 may actuate a relay to activate a charging port 106 and/or unlock a cover of the charging port 106. Following the block 240, the process 200 ends, or alternatively returns to the decision block 210.

Figure 4:
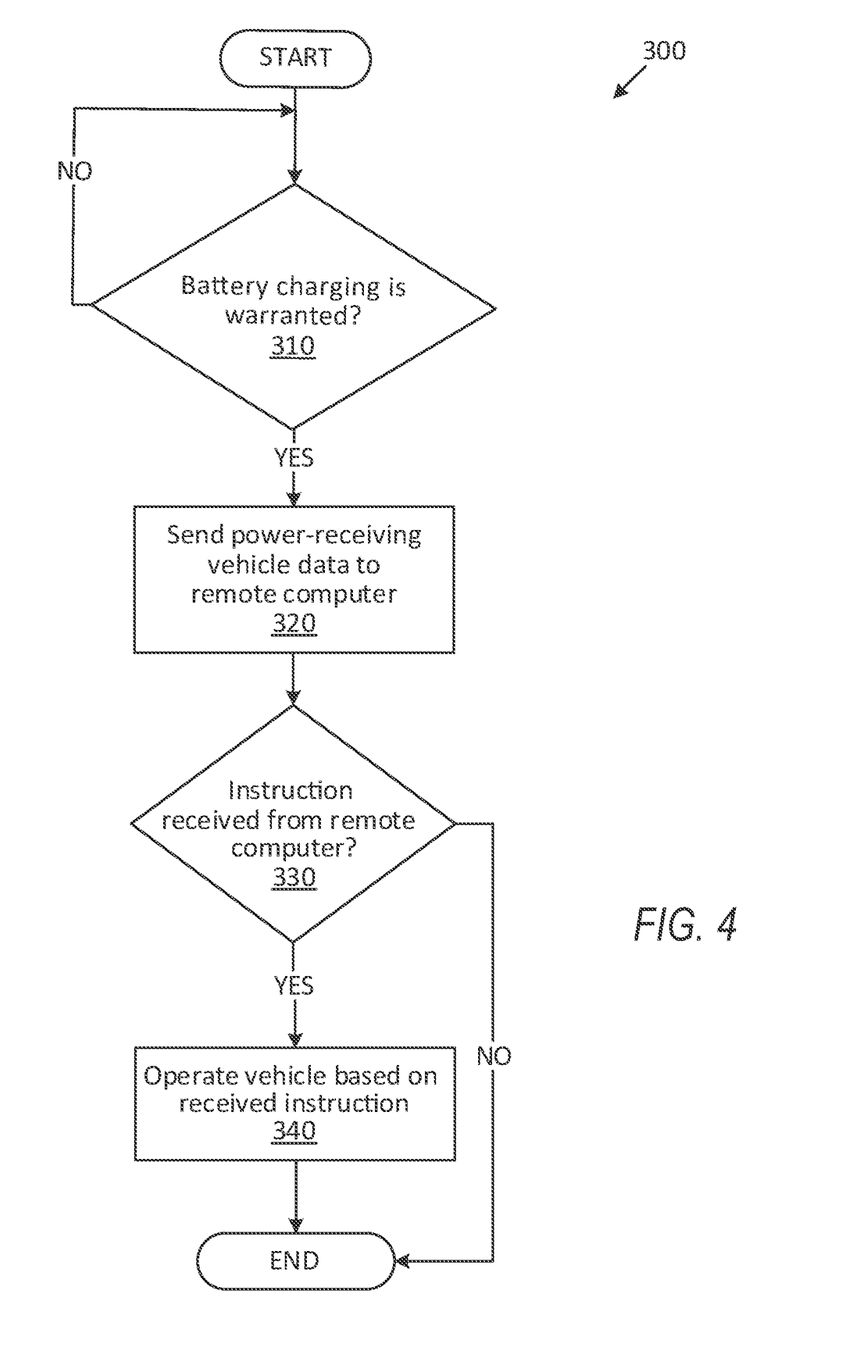
FIG. 4 is a flowchart of an example process for charging a power-receiving vehicle.

FIG. 4 is a flowchart of an exemplary process 300 for charging a battery assembly 110 of a power-receiving vehicle 100. A computer 114 of a power-receiving vehicle 100 may be programmed to execute blocks of the process 300. Note that a vehicle may be operated at some times as a power-receiving vehicle 100 and at other times as a power-supplying vehicle 101. FIG. 4 shows an example process 300 for power-receiving operation.

The process 300 begins in a decision block 310, in which the computer 114 determines whether battery charging is warranted. The computer 114 may be programmed to determine that charging of the battery assembly 110 of the power-receiving vehicle 100 is warranted (or needed) based on a user input received from the HMI 104, a charge needed to reach a specified destination and currently available charge, etc. If the computer 114 determines that charging of the battery assembly 110 of the power-receiving vehicle 100 is needed, then the process 300 proceeds to a block 320 otherwise the process 300 returns to the decision block 310, or alternatively ends although not shown in FIG. 4.

In the block 320, the computer 114 sends power-receiving vehicle 100 data to the remote computer 120. The computer 114 may send data such as data shown in Table 1, e.g., maximum range, requested energy amount, location, etc.

Next, in a decision block 330, the computer 114 determines whether a directive is received from the remote computer 120. A directive received from the remote computer 120 may be any of (i) a directive to flash the lights 102 of the power-receiving vehicle 100, (ii) to navigate the power-receiving vehicle 100 to a charging location, e.g., a location of the power-supplying vehicle 101, (iii) to output audio and/or visual instructions to the HMI 104, etc. If the computer 114 determines that a directive is received from the remote computer 120, then the process 300 proceeds to a block 340 otherwise the process 300 ends, or alternatively returns to the decision block 310.

In the block 340, the computer 114 operates the power-receiving vehicle 100 based on the received instructions. For example, the computer 114 actuates lights 102 of the power-receiving vehicle 100 based on the received instruction to flash the lights 102. The computer 114 may navigate the power-receiving vehicle 100 to the charging location, e.g., by actuating vehicle actuators 118 and/or outputting navigation instructions to the HMI 104. The computer 114 may output audio and/or visual instructions to an HMI 104, e.g., mounted to an exterior surface of the power-receiving vehicle 100 for a user of the power-receiving vehicle 100. Following the block 340, the process 200 ends, or alternatively returns to the decision block 210.

Figure 5A:
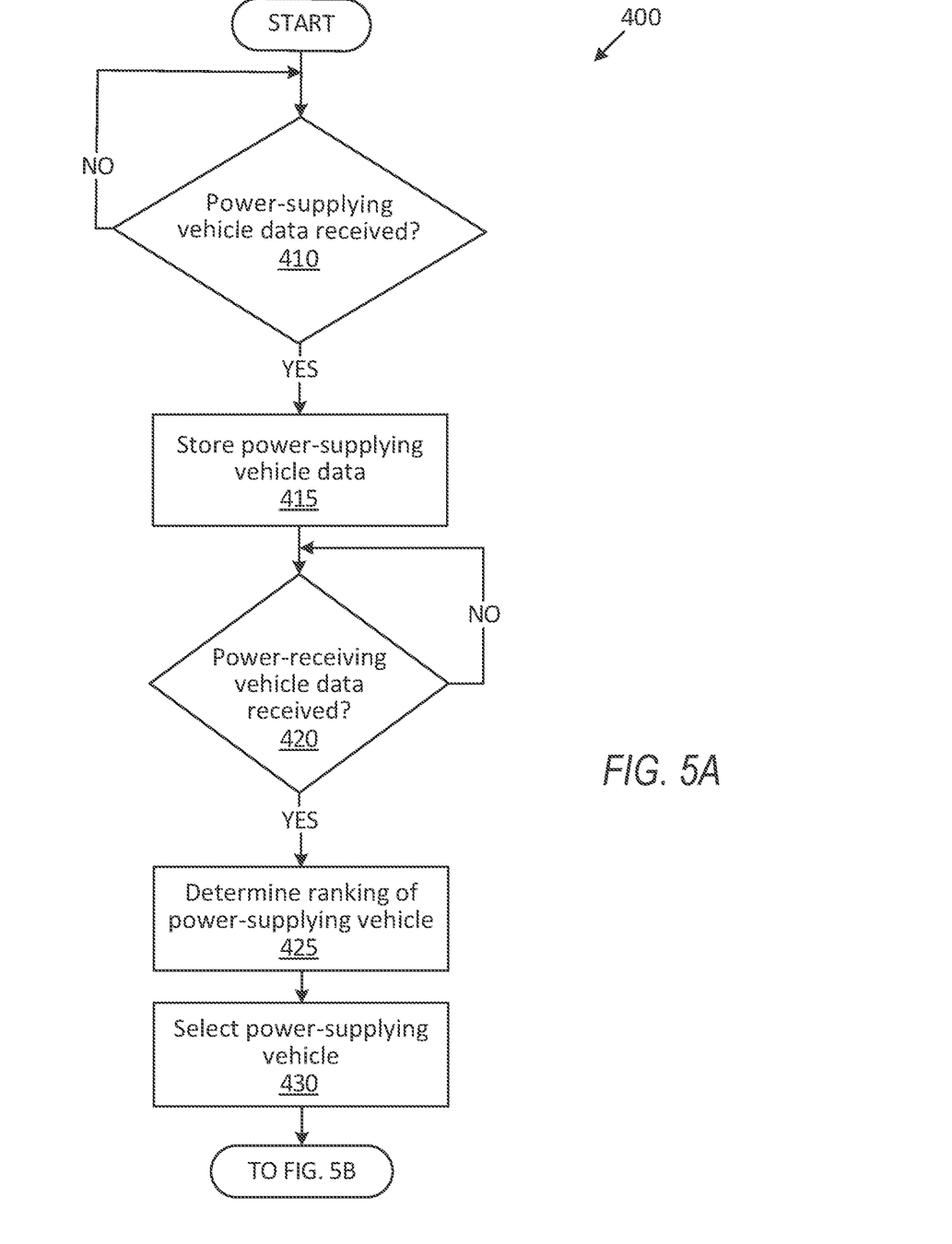
FIGS. 5A-5C are a flowchart of an example process for operating a remote computer.
Figure 5B:
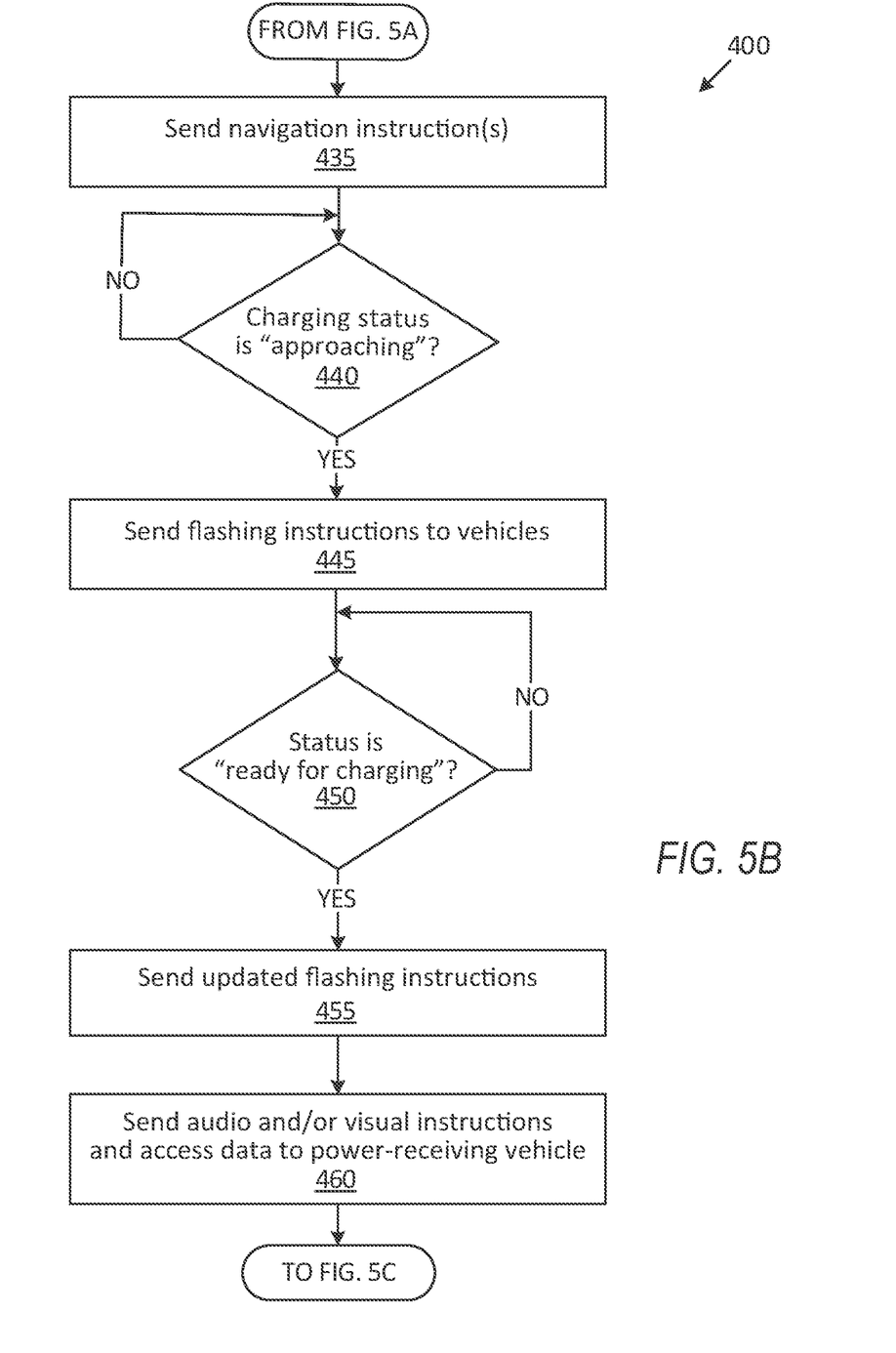
Figure 5C:
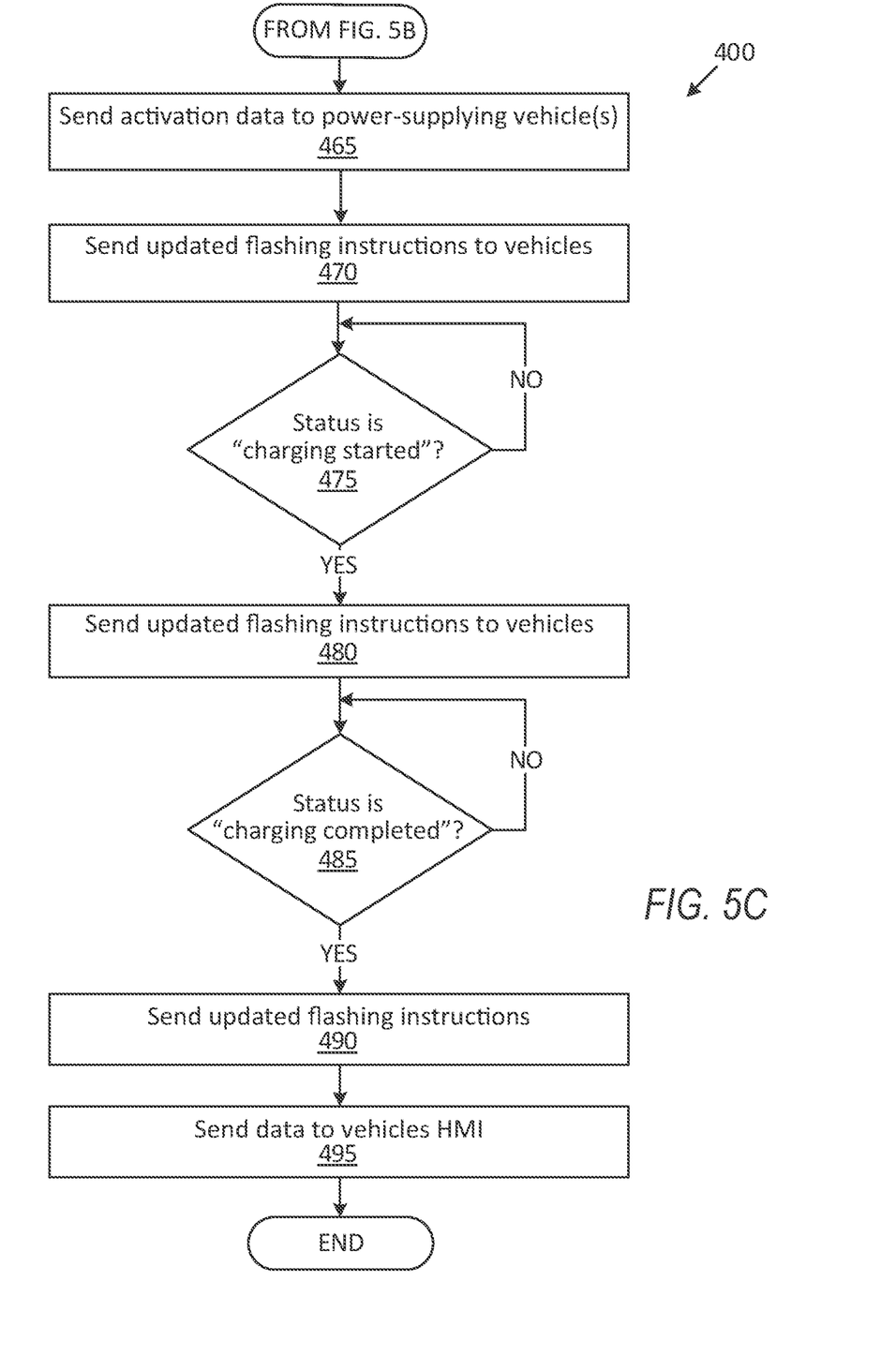

FIGS. 5A-5C are collectively a flowchart of a process 400 for operating a remote computer 120. The remote computer 120 may be programmed to execute blocks of the process 400.

With reference to FIG. 5A, the process 400 begins in a decision block 410, in which the remote computer 120 determines whether power-supplying vehicle 101 data is received. The remote computer 120 may be programmed to receive data from one or more power-supplying vehicles 101, e.g., via wireless communications. The remote computer 120 may receive data such as shown in Table 2. If the remote computer 120 determines that power-supplying vehicle 101 data is received, then the process 400 proceeds to a block 415 otherwise the process 400 returns to the decision block 410, or alternatively ends, although not shown in FIG. 5A.

In the block 415, the remote computer 120 stores the received power-supplying vehicle 101 data. The remote computer 120 may store the received data of the candidate power-supplying vehicles 101 in a remote computer 120 memory, e.g., associated with a vehicle identifier.

Next, in a decision block 420, the remote computer 120 determines whether power-receiving vehicle 100 data is received. The remote computer 120 may be programmed to receive via wireless communication data such as shown in example Table 1. If the remote computer 120 determines that power-receiving vehicle 100 data is received, then the process 400 proceeds to a block 425 otherwise the process 400 returns to the decision block 420, or alternatively the process 400 ends, although not shown in FIG. 5A.

In the block 425, the remote computer 120 determines a ranking of the power-supplying vehicles 101 for the power-receiving vehicle 100. If data from multiple power-receiving vehicles 100 is received, then the remote computer 120 may be programmed to determine a ranking of power-supplying vehicles 101 for each of the power-receiving vehicles 100. For example, a high ranked candidate power-supplying vehicle 101 for a first power-receiving vehicle 100 vehicle may be a low ranked power-supplying vehicle 101 for a second power-receiving vehicle 100, e.g., because the respective power-supplying vehicle 101 is nearer to the first power-receiving vehicle 100 than the second power-receiving vehicle 100. As discussed above, the remote computer 120 may be programmed to identify power-supplying vehicles 101 based on electrical configuration, amount of available energy and amount of requested energy, etc. Then, the remote computer 120 may be programmed to rank the identified power-supplying vehicles 101.

Next, in a block 430, the remote computer 120 selects a power-supplying vehicle 101 for the power-receiving vehicle 100. In one example, the remote computer 120 may select the highest rank candidate power-supplying vehicle 101. In another example, the remote computer 120 may be programmed to send a request for approval to two highest ranked candidate power-supplying vehicles 101 (if applicable), and select the power-supplying vehicle 101 which responds first to approve. Additionally or alternatively, other selection mechanisms may be used.

With reference to FIG. 5B, next, in a block 435, the remote computer 120 sends navigation instruction(s). The remote computer 120 may be programmed to determine a charging location, e.g., an area including location of the power-receiving vehicle 100, an area including location of the selected power-supplying vehicle 101, or another area not including any of the locations of the power-receiving vehicle 100 and the selected power-supplying vehicle 101. The remote computer 120 may be programmed to determine the charging area such that the vehicles 100, 101 can be located next to one another to connect the charging cable 108. The navigation instructions may additionally specify a vehicle orientation at the charging location to accommodate a connection of charging cable 108.

Next, in a decision block 440, the remote computer 120 determines whether the charging status is "approaching." If the remote computer 120 determines the approaching status, then the process 400 proceeds to a block 445; otherwise the process 400 returns to the decision block 440.

In the block 445, the remote computer 120 sends a directive to flash the lights 102 of the power-receiving vehicle 100 and/or the selected power-supplying vehicle 101 based on the approaching status to the power-receiving vehicle 100 and/or the selected power-supplying vehicle 101.

Next, in a decision block 450, the remote computer 120 determines whether the charging state is "ready for charging." If the remote computer 120 determines the ready for charging status, then the process 400 proceeds to a block 455 otherwise the process 400 returns to the decision block 450.

In the block 455, the remote computer 120 sends an updated directive to flash the lights 102 of the power-receiving vehicle 100 and/or the selected power-supplying vehicle 101 based on the determined ready for charging status. In one example, each of the states may have a different associated rate of flashing.

Next, in a block 460, the remote computer 120 sends audio and/or visual guidance and access data to power-receiving vehicle 100. The remote computer 120 may be programmed to send audio and/or visual guidance describing how to reach to the charging cable 108 and connect the charging cable 108 to the power-supplying vehicle 101. The remote computer 120 may be programmed to send access data to, e.g., unlock a cover of a charging port 106 of the power-supplying vehicle 101.

With reference to FIG. 5C, next, in a block 465, the remote computer 120 sends activation data to power-supplying vehicle 101. For example, the remote computer 120 may send an activation signal to actuate a relay to turn on the power to the charging port 106, to unlock a cover of the charging port 106, etc. The remote computer 120 may be programmed to send audio and/or visual directives on how to connect the charging cable 108 to the HMI 104 of the power-supplying vehicle 101, e.g., mounted to an exterior surface of the power-supplying vehicle 101. Thus, a user of the power-receiving vehicle 100 may receive guidance on how to connect the charging cable 108 without gaining access to an interior of the power-supplying vehicle 101.

Next, in a block 470, the remote computer 120 sends updated directive to flash the lights 102 of the power-receiving vehicle 100 and/or the selected power-supplying vehicle 101. The remote computer 120 may be programmed to update the flashing rate based on the determined charging status.

Next, in a decision block 475, the remote computer 120 determines whether the charging status is "charging started." If the remote computer 120 determines the charging started state, then the process 400 proceeds to a block 480 otherwise the process 400 returns to the decision block 475.

In the block 480, the remote computer 120 sends updated actuation directive to flash the lights 102 of the vehicles 100, 101 based on the determined charging started state. Additionally, the remote computer 120 may be programmed to send data to a mobile device of a vehicle 100, 101 user indicating that charging of the power-receiving vehicle 100 is in progress.

Next, in a decision block 485, the remote computer 120 determines whether the charging status is "charging completed." If the remote computer 120 determines, e.g., based on determining that amount of electrical energy exceeding the requested amount of electrical energy, that the charging is complete, then the process 400 proceeds to a block 490 otherwise the process returns to the decision block 485, or alternatively the process 400 ends, although not shown in FIG. 5C.

In the block 495, the remote computer 120 sends data to the HMI 104 in the power-receiving vehicle 100 and/or the power-supplying vehicle 101. The data may include status update or confirmation of completed charging. Additionally or alternatively, the remote computer 120 may send data to one or more mobile devices associated with users of the power-receiving vehicle 100 and/or power-supplying vehicle 101.

Following the block 495, the process 400 ends or returns to the decision block 410, although not shown in FIGS. 5A-5C.

Use of in response to, based on, and upon determining herein indicates a causal relationship, not merely a temporal relationship.

Computer executable instructions may be compiled or interpreted from computer programs created using a variety of programming languages and/or technologies, including, without limitation, and either alone or in combination, Java, C, C, Visual Basic, Java Script, Perl, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random-access memory, etc. A computer readable medium includes any medium that participates in providing data e.g., instructions, which may be read by a computer. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer, comprising a processor and a memory, the memory storing instructions executable by the processor, the instructions including instructions to:
receive, from a power-receiving vehicle, power-receiving vehicle data identifying the power-receiving vehicle;
identify one or more power-supplying vehicles for providing charging to the power-receiving vehicle;
determine a rank for each of the identified one or more power-supplying vehicles relative to one another based on the received power-receiving vehicle data and data received from the one or more power-supplying vehicles;
upon selecting one of the one or more power-supplying vehicles, provide a navigation instruction to navigate at least one of the power-receiving vehicle and the selected power-supplying vehicle to a charging location based on a power-receiving vehicle location and a selected power-supplying vehicle location;
send access data to the power-receiving vehicle to access a charge port of the selected power-supplying vehicle;
send a first light actuation instruction to the power-supplying vehicle based on a status of charging; and
send a second light actuation instruction to the power-receiving vehicle based on the status of charging.

2. The system of claim 1, wherein the power-receiving vehicle data includes a requested energy amount, a current charge level of a battery assembly of the power-receiving vehicle, and a location or a route of the power-receiving vehicle.

3. The system of claim 1, wherein the data received from the one or more power-supplying vehicles includes (i) a time window of availability for charging, (ii) data specifying whether the respective vehicle has an ability for a bidirectional charging, (iii) a location of the respective vehicle, and (iv) a fee rate for charging.

4. The system of claim 1, wherein the status of charging includes at least one of (i) approaching, (ii) ready to start charging, (iii) charging in progress, and (iv) charging completed.

5. The system of claim 1, wherein the instructions further include instructions to send the first light actuation instruction including a directive to flash one or more lights of the power-supplying vehicle based on a first rate determined based on the charging status.

6. The system of claim 1, wherein the instructions further include instructions to send the second light actuation instruction including a directive to flash one or more lights of the power-receiving vehicle based on a second rate determined based on the charging status.

7. The system of claim 1, wherein the instructions further include instructions to output an audio instruction from the power-supplying vehicle based on the status of charging.

8. The system of claim 1, wherein the rank specifies a suitability of a respective power-supplying vehicle to charge the power-receiving vehicle.

9. A method for charging a power-receiving vehicle, comprising:
receiving, from the power-receiving vehicle, power-receiving vehicle data identifying the power-receiving vehicle;
identifying one or more power-supplying vehicles for providing charging to the power-receiving vehicle;
determining a rank for each of the identified one or more power-supplying vehicles relative to one another based on the received power-receiving vehicle data and data received from the one or more power-supplying vehicles;
upon selecting one of the one or more power-supplying vehicles, providing a navigation instruction to navigate at least one of the power-receiving vehicle and the selected power-supplying vehicle to a charging location based on a power-receiving vehicle location and a selected power-supplying vehicle location;
sending access data to the power-receiving vehicle to access a charge port of the selected power-supplying vehicle;
sending a first light actuation instruction to the power-supplying vehicle based on a status of charging; and
sending a second light actuation instruction to the power-receiving vehicle based on the status of charging.

10. The method of claim 9, wherein the power-receiving vehicle data includes a requested energy amount, a current charge level of a battery assembly of the power-receiving vehicle, and a location or a route of the power-receiving vehicle.

11. The method of claim 9, wherein the data received from the one or more power-supplying vehicles includes (i) a time window of availability for charging, (ii) data specifying whether the respective vehicle has an ability for a bidirectional charging, (iii) a location of the respective vehicle, and (iv) a fee rate for charging.

12. The method of claim 9, wherein the status of charging includes at least one of (i) approaching, (ii) ready to start charging, (iii) charging in progress, and (iv) charging completed.

13. The method of claim 9, further comprising sending the first light actuation instruction including a directive to flash one or more lights of the power-supplying vehicle based on a first rate determined based on the charging status.

14. The method of claim 9, further comprising sending the second light actuation instruction including a directive to flash one or more lights of the power-receiving vehicle based on a second rate determined based on the charging status.

15. The method of claim 9, further comprising outputting an audio instruction from the power-supplying vehicle based on the status of charging.

16. The method of claim 9, wherein the rank specifies a suitability of a respective power-supplying vehicle to charge the power-receiving vehicle.

* * * * *